Dec. 15, 1964 KENJI OKAMURA ETAL 3,161,079
CRANKSHAFT FOR 60°-W TYPE TWENTY-FOUR
CYLINDER ENGINE
Filed Oct. 23, 1962

United States Patent Office 3,161,079
Patented Dec. 15, 1964

3,161,079
CRANKSHAFT FOR 60°-W TYPE TWENTY-FOUR CYLINDER ENGINE
Kenji Okamura and Tsutomu Numata, Tokyo, and Tetsuya Matsumura, Yokohama, Japan, assignors to Mitsubishi Nippon Jukogyo Kabushiki-Kaisha, Tokyo, Japan, a corporation of Japan
Filed Oct. 23, 1962, Ser. No. 232,377
1 Claim. (Cl. 74—603)

This invention relates to improvements in a crankshaft used with a multi-cylinder engine including twenty-four cylinders arranged in three cylinder banks in a substantially W shaped configuration with the central planes of the respective cylinder banks tilted at angles of 60 degrees to each other.

In general, a crankshaft for a multi-cylinder engine is adapted to be driven at a relatively high speed of rotation to convert reciprocal movement of the associated pistons into rotational movement. If the crankshaft and the associated main moving parts such as pistons and connecting rods are in even a slightly unbalanced state the engine will effect vibrational movement. To prevent this vibrational movement of the engine or to maintain the crankshaft and the associated main moving parts in a balanced state it has frequently been the practice to attach balance weights to the crank arms of the crankshaft. In such case, it is very desirable to maintain the crankshaft and associated main moving parts as a whole in substantially complete equilibrium and simultaneously to minimize the magnitudes of internal couples remaining locally thereon, even though they would be balanced as a whole, taking into consideration the existing technical processes of manufacturing the same.

An object of the invention is accordingly to provide means for maintaining the entire mass of a crankshaft for a 60°-W type twenty-four cylinder engine in substantially complete equilibrium and simultaneously minimizing the magnitudes of internal couples on the crankshaft in a simple and effective manner.

A more specific object of the invention is to provide an improved crank arrangement of a crankshaft for a 60° W type-twenty-four cylinder engine wherein respective cylinders are to be fired one after another at equal intervals of time as well as an improved arrangement of balance weights on the crankshaft in order to accomplish the object described in the preceding paragraph.

With the above objects in view the invention resides in a crankshaft for a 60°-W type twenty-four cylinder engine comprising a crank arrangement consisting of a front crank portion including four pairs of crank arms and four crank pins connected between the associated pairs of the crank arms, the radial positions of said crank arm pairs being angularly displaced from each other at right angles in the order of cylinder Nos. 1, 3, 4 and 2, and a rear crank portion identical in configuration with said front crank portion and connected to the front crank portion in an end for end reversed position and having the crank arm pairs at an angle of 45 degrees with respect to the corresponding crank arm pairs on the front crank portion, and a balance weight attached to at least one arm of each of the crank arms pairs for cylinders Nos. 1, 4, 5 and 8, said balance weight having a mass corresponding to a magnitude of one of two equal vectors derived from a resultant vector which in turn is composed of vectors of a pair of internal couples on said front and rear crank portions respectively, said first-mentioned equal vectors being less in magnitude than the respective vectors of said pair of couples, whereby said crank arrangement as a whole is maintained in substantially complete equilibrium with an internal couple on each of said front and rear crank portions being minimized.

The invention will become more readily apparent from the following detailed description taken in conjunction with the accompanying drawings in which.

The present invention is based upon the necessity that, in designing and manufacturing a 60°-W type twenty-four cylinder engine, a crankshaft used therewith should be, as a whole, in substantially complete equilibrium and have an internal couple thereon whose magnitude will be as low as possible and that respective cylinders of the engine should be fired at equal intervals of time.

Figure 1A:
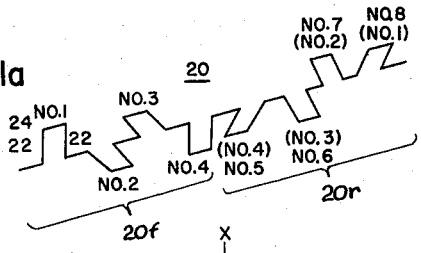
FIGS. 1a and 1b show diagrammatically a crank arrangement for a 60°-W type twenty-four cylinder engine according to the teachings of the invention.
Figure 1B:
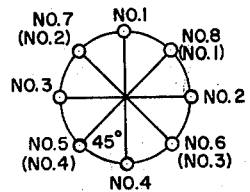

Referring now to FIGS. 1a and 1b of the drawings there is diagrammatically illustrated a crank arrangement for a 60°-W type twenty-four cylinder engine embodying the teachings of the invention. A crank arrangement 20 comprises a front crank portion or a lefthand crank portion 20f as viewed in the figures and a rear or righthand crank portion 20r identical in configuration with the front crank portion and operatively connected to the front crank portion in an end for end reversed position. The radial positions of the crank arm pairs on the rear crank portion are angularly displaced from the respective pairs of crank arms on the front crank portion by an angle of 45° in the clockwise direction as viewed in the figures.

More specifically, the front crank portion 20f includes four pairs of crank arms 22 the radial positions of which are angularly displaced from each other at right angles in the order of cylinder Nos. 1, 3, 4 and 2 and four crank pins 24 are connected between the associated pairs of crank arms respectively. The rear crank portion 20r includes a first pair of crank arms for cylinder No. 5 operatively connected to the rear end of the front crank portion and followed by a second pair of crank arms for cylinder No. 6 which, in turn, is followed by a third pair of crank arms for cylinder No. 7 and the last or a fourth pair of crank arms for cylinder No. 8. As shown in the figures, the radial positions of these crank arm pairs are angularly displaced from each other in the order of cylinder Nos. 7, 5, 6 and 8 or in the order opposite to that for the front crank portion as illustrated by the parenthesized numerals. Further the radial positions of the first, second, third and fourth crank-arm pairs of the rear crank portion are angularly displaced by angles of 45 degrees from the fourth, third, second and first crank-arm pairs of the front crank portion respectively.

Figure 2:
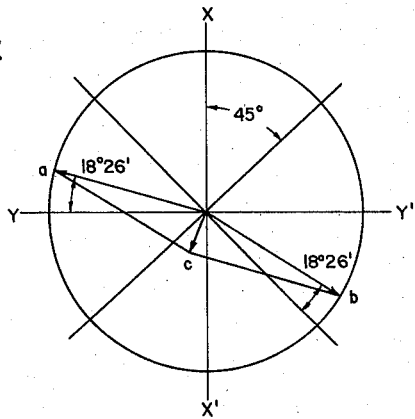
FIG 2 is a vector diagram illustrating couples to be balanced in the crank arrangement shown in FIGS. 1a and 1b.

With the arrangement thus far described unbalanced couples on the front and rear crank portions respectively, which couples are due to rotation of the masses of the crank arms and crank pins at different points along the length of the shaft, have their vectors a and b as shown in FIG. 2 respectively. The magnitudes of these vectors are equal to each other and correspond to the magnitude of $|M|$ expressed by the Equation 1 as follows:

$$|M| = \sqrt{10}\left(m_t + \frac{3}{2}m\right)r\omega^2 l \qquad (1)$$

where $m_t$=rotating mass considered as being concentrated or lumped on a crank pin portion of the crankshaft.
$m$=reciprocating mass considered as being lumped on the crank pin portion.
$r$=one half a piston stroke.
$\omega$=angular speed of the engine.

The vectors $a$ and $b$ are resolved into a vector C as shown in FIG. 2. Calculating the magnitude $|Mc|$ of the resultant vector C we obtain $$\begin{aligned}|Mc| &= |M| \times 2 \cos\,(67°30'+18°26') \\ &= |M| \times 2 \times 0.0709 \\ &= |M| \times 0.1418 \end{aligned} \qquad (2)$$

This Equation 2 indicates that an unbalanced couple in the crank arrangement shown in FIGS. 4a and 4b has its magnitude equal only to 14.18% of an unbalanced couple on a crankshaft for a twelve cylinder engine of the same type. Therefore, the total mass of balance weights necessary for balancing the unbalancing couple can be very small.

Figure 4:
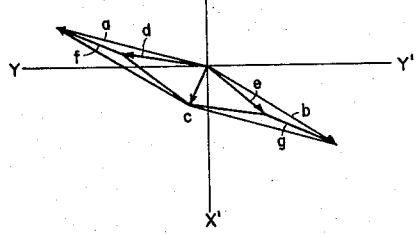
FIG 4 is a vector diagram useful for explaining the principle of the invention.
Figure 3:
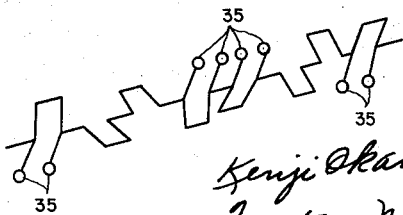
FIG. 3 shows diagrammatically the manner in which balance weights are mounted on a crankshaft illustrated in FIGS. 1a and 1b.

As shown in FIG. 4, the resultant vector C composed of vectors $a$ and $b$ equal in magnitude to each other is broken down into a pair of vectors $d$ and $e$ equal to each other and less than the vectors $a$ and $b$ in magnitude. Then a balance weight is operatively coupled to each of the crank-arm pairs on both ends of each crank portion or to each of the crank-arm pairs for cylinder Nos. 1, 4, 5 and 8. In FIG. 8 a pair of such balance weights designated by the reference numeral 35 are shown as being attached to both arms of each of the crank-arm pairs for cylinder Nos. 1, 4, 5 and 8 respectively. It is however to be understood that a balance weight may be attached only to one arm of each of such crank arm pairs, if desired.

The magnitude of each of the vectors $f$ and $g$ can be properly selected dependent upon the manufacturing requirements.

In this way, the crankshaft of the invention as a whole is maintained in substantially complete equilibrium and if the crankshaft is assumed to be divided into a front crank portion and a rear crank portion identical in configuration with the same then an internal couple on each of the crank portions corresponds to a vector $f$ or $g$ shown in FIG. 4 whose magnitude is smaller than that of the corresponding initial vector $a$ or $b$ respectively. Since the magnitude of the vector $f$ or $g$ depends upon that of the associated vector $d$ or $e$, the magnitudes of the remaining internal couples should be compromised with those of the couples to be balanced in accordance with the fabricating requirements.

From the foregoing it will be appreciated that the objects of the invention have been accomplished by the provision of a special crank arrangement comprising a front crank portion and a rear crank portion identical in configuration with the same, and a balance weight operatively coupled to each of the front and rear crank arms of each crank portion and having a small mass. This arrangement ensures that the associated cylinders are fired one after another at equal intervals of time resulting in torque fluctuation being minimized. Further, because of its construction, the crank arrangement allows the engine to vibrate with an extremely low amplitude. Therefore, only a vibration of a very low amplitude is permitted from the engine to the environment of the same through the mountings for the engine.

What we claim is:

A crankshaft for a 60°-W type twenty-four cylinder engine comprising a crank arrangement consisting of a front crank portion including four pairs of crank arms and four crank pins connected between the associated pairs of the crank arms, the radial positions of said crank arm pairs being angularly displaced from each other at right angles in the order of cylinder Nos. 1, 3, 4 and 2, and a rear crank portion identical in configuration with said front crank portion and connected to said front crank portion in an end-for-end reversed position, said rear crank portion having pairs of crank arms at an angle of 45 degrees to the corresponding crank arm pairs on the front crank portion, and a balance weight attached to at least one arm of each of the crank arm pairs for cylinder Nos. 1, 4, 5 and 8, said balance weight having a mass corresponding to a magnitude of one of two equal vectors derived from a resultant vector, said resultant vector being composed of vectors of a pair of unbalanced couples on said front and rear crank portions respectively, said first-mentioned equal vectors being less in magnitude than the respective vectors of said pair of couples, whereby said crank arrangement as a whole is maintained in substantially complete equilibrium with an internal couple on each of said front and rear crank portions being minimized.

References Cited by the Examiner

UNITED STATES PATENTS 2,680,427   6/54   Summers _____ 74—603

FOREIGN PATENTS 337,475   11/30   Great Britain.

BROUGHTON G. DURHAM, *Primary Examiner.*